(12) United States Patent
Homma

(10) Patent No.: US 11,362,358 B2
(45) Date of Patent: Jun. 14, 2022

(54) FUEL CELL MODULE

(71) Applicant: HONDA MOTOR CO., LTD., Tokyo (JP)

(72) Inventor: Hiroki Homma, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 27 days.

(21) Appl. No.: 16/942,817

(22) Filed: Jul. 30, 2020

(65) Prior Publication Data
US 2021/0043954 A1 Feb. 11, 2021

(30) Foreign Application Priority Data
Aug. 8, 2019 (JP) .............................. JP2019-145926

(51) Int. Cl.
*H01M 8/0612* (2016.01)
*H01M 8/04014* (2016.01)

(52) U.S. Cl.
CPC ..... *H01M 8/0618* (2013.01); *H01M 8/04022* (2013.01)

(58) Field of Classification Search
None
See application file for complete search history.

(56) References Cited

U.S. PATENT DOCUMENTS

| | | | |
|---|---|---|---|
| 2015/0364782 A1* | 12/2015 | Tsukamoto | H01M 8/2432 422/414 |
| 2015/0380756 A1* | 12/2015 | Orishima | H01M 8/0618 429/419 |
| 2020/0355111 A1* | 11/2020 | Lusardi | F04D 29/2216 |

FOREIGN PATENT DOCUMENTS

| | | | |
|---|---|---|---|
| JP | 5730683 | * | 4/2015 |
| JP | 2016-001524 | | 1/2016 |

* cited by examiner

*Primary Examiner* — Alix E Eggerding
(74) *Attorney, Agent, or Firm* — Amin, Turocy & Watson, LLP

(57) ABSTRACT

In a fuel cell module, a reformer and an evaporator provided adjacent to each other each extend to surround at least part of outer periphery of an exhaust gas combustion chamber as viewed in the direction of arrangement of the reformer and the evaporator. An auxiliary device case surrounds the outer periphery of the reformer and the evaporator with clearance. Both ends of the evaporator in the extension direction thereof are spaced from each other. The evaporator and the auxiliary device case are connected only by a first connector section at one position. The evaporator and the reformer are connected only by a second connector section at one position. Both ends of the reformer in the extension direction thereof are spaced from each other. The reformer and the auxiliary device case are connected only by a third connector section at one position.

7 Claims, 9 Drawing Sheets

FUEL CELL MODULE

CROSS-REFERENCE TO RELATED APPLICATION

This application is based upon and claims the benefit of priority from Japanese Patent Application No. 2019-145926 filed on Aug. 8, 2019, the contents of which are incorporated herein by reference.

BACKGROUND OF THE INVENTION

Field of the Invention

The present invention relates to a fuel cell module including a fuel cell which performs power generation consuming a fuel gas and an oxygen-containing gas supplied to the fuel cell, and discharges a fuel exhaust gas and an oxygen-containing exhaust gas.

Description of the Related Art

For example, in a fuel cell module including a solid oxide fuel cell (SOFC) using solid oxide such as stabilized zirconia as electrolyte, a fuel gas and an oxygen-containing gas are supplied to the fuel cell for inducing electrochemical reactions to perform power generation. Examples of the fuel gas include a hydrogen-containing gas which is obtained by steam reforming reaction of raw fuel chiefly containing hydrocarbon such as a city gas or propane gas and water vapor in a reformer. Further, examples of the oxygen-containing gas include the air, etc.

Unconsumed portions of the fuel gas and the oxygen-containing gas which have not been consumed in electrochemical reactions are discharged as the fuel exhaust gas and the oxygen-containing exhaust gas from the fuel cell. For example, as shown in Japanese Laid-Open Patent Publication No. 2016-001524, a fuel cell module including a combustor where the fuel exhaust gas and the oxygen-containing exhaust gas are combusted inside an exhaust gas combustion chamber to produce a combustion exhaust gas is known. By combusting the fuel exhaust gas using the oxygen-containing exhaust gas in the combustor, it is possible to obtain heat energy, and moreover, it is possible to easily suppress discharging of the unconsumed fuel gas.

The fuel cell module in Japanese Laid-Open Patent Publication No. 2016-001524 includes a casing held between a fuel cell and a heat exchanger for preheating the oxygen-containing gas before it is supplied to the fuel cell. The exhaust gas combustion chamber, and a frame shaped reformer facing an outer peripheral wall of the exhaust gas combustion chamber with clearance, are provided inside the casing. An outer peripheral wall of the exhaust gas combustion chamber is provided with a combustion chamber outlet for discharging the combustion exhaust gas from the exhaust gas combustion chamber. While heat exchange is performed between the combustion exhaust gas discharged from the combustion chamber outlet and the reformer, the combustion exhaust gas flows inside the casing. That is, the heat energy of the combustion exhaust gas obtained in the combustor can be utilized for heating the reformer, etc. operated in a high temperature range.

SUMMARY OF THE INVENTION

In the fuel cell module of this type, if the temperature of the exhaust gas combustion chamber is increased excessively in the above combustion reaction, there is a concern that deformation, oxidation, etc. which may degrade the durability of walls, etc. forming the exhaust gas combustion chamber may occur, and as a consequence, there is a concern that the durability of the fuel cell module is degraded.

Further, it may be considered that fuel cell auxiliary devices such as the exhaust gas combustion chamber, the reformer, and an evaporator for generating water vapor supplied to the reformer are provided in the form of units, and in this state, accommodated in an auxiliary device case. In this case, the reformer and the evaporator, etc. in the auxiliary device case are bound in the auxiliary device case since connector sections for connecting the reformer and the evaporator, etc. together and connector sections for connecting the reformer and evaporator, etc. to the auxiliary device case are provided. Further, when operation of the fuel cell auxiliary devices is started, the temperatures of the exhaust gas combustion chamber and the reformer become higher than the temperature of the evaporator. That is, the component parts in the auxiliary device case are operated at temperatures that are different from each other.

As a result, when thermal strain (thermal expansion, etc.) due to the temperature change occurs in each of the component parts and the auxiliary device case, thermal stress is generated in the respective component parts themselves in the auxiliary device case, the connector sections for connecting the component parts together, and the connector sections for connecting each of the component parts to the auxiliary device case. Also for this reason, there is a concern that the durability of the fuel cell module may be degraded.

In view of the above, an object of the present invention is to provide a fuel cell module which makes it possible to suppress degradation in the durability due to the temperature change.

According to one aspect of the present invention, provided is a fuel cell module including a fuel cell configured to perform power generation consuming a fuel gas and an oxygen containing gas supplied to the fuel cell, and discharge a fuel exhaust gas and an oxygen-containing exhaust gas, a reformer configured to reform a raw fuel chiefly containing hydrocarbon using water vapor, and produce the fuel gas supplied to the fuel cell, an evaporator configured to evaporate water to produce the water vapor supplied to the reformer, a combustor configured to combust the fuel exhaust gas and the oxygen-containing exhaust gas inside an exhaust gas combustion chamber to produce a combustion exhaust gas, and an auxiliary device case configured to accommodate the reformer, the evaporator and at least part of the exhaust gas combustion chamber, wherein each of the reformer and the evaporator provided adjacent to each other extends in a direction to surround at least part of outer periphery of the exhaust gas combustion chamber as viewed in a direction in which the reformer and the evaporator are arranged, the auxiliary device case surrounds outer periphery of the reformer and outer periphery of the evaporator with clearance, both ends of the evaporator in a direction in which the evaporator extends are spaced from each other, the evaporator and the auxiliary device case are connected together only by a first connector section at one position, the evaporator and the reformer are connected together only by a second connector section at one position, both ends of the reformer in a direction in which the reformer extends are spaced from each other, and the reformer and the auxiliary device are connected together only by a third connector section at one position.

Normally, the reformer and the evaporator are operated at a temperature which is lower than the temperature of the exhaust gas combustion chamber. Therefore, by providing each of the reformer and the evaporator to surround at least part of outer periphery of the exhaust gas combustion chamber, it is possible to transmit heat of the exhaust gas combustion chamber to the reformer and the evaporator. In this manner, since it is possible to suppress excessive increase in the temperature of the walls, etc. of the exhaust gas combustion chamber, it is possible to suppress occurrence of the situation where the temperature of the walls, etc. of the exhaust gas combustion chamber rises to a temperature at which durability thereof is degraded, during operation of the fuel cell module.

Clearance is provided between the outer periphery of each of the reformer and the evaporator, and the auxiliary device case. Further, the evaporator has a shape where one end and the other end of the evaporator in the direction in which the evaporator extends are spaced from each other, and the reformer has a shape where one end and the other end of the reformer in the direction in which the reformer extends are spaced from each other. Further, the evaporator and the auxiliary device case are connected together only by a first connector section at one position, the evaporator and the reformer are connected together only by a second connector section at one position, and the reformer and the auxiliary device case are connected together only by a third connector section at one position. That is, each of the reformer, the evaporator, and the auxiliary device case is bound to the requisite minimum degree.

As a result, in the auxiliary device case, each of the evaporator and the reformer tends to be deformed freely with small binding (deformed in a manner that generation of the stress is suppressed). Thus, even if thermal strain occurs due to the temperature change in each of the reformer, the evaporator, the auxiliary device case, the first connector section, the second connector section, the third connector section, etc., it is possible to suppress generation of the thermal stress.

As can be seen from the above, according to this fuel cell module, it is possible to suppress degradation in the durability due to the temperature change.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
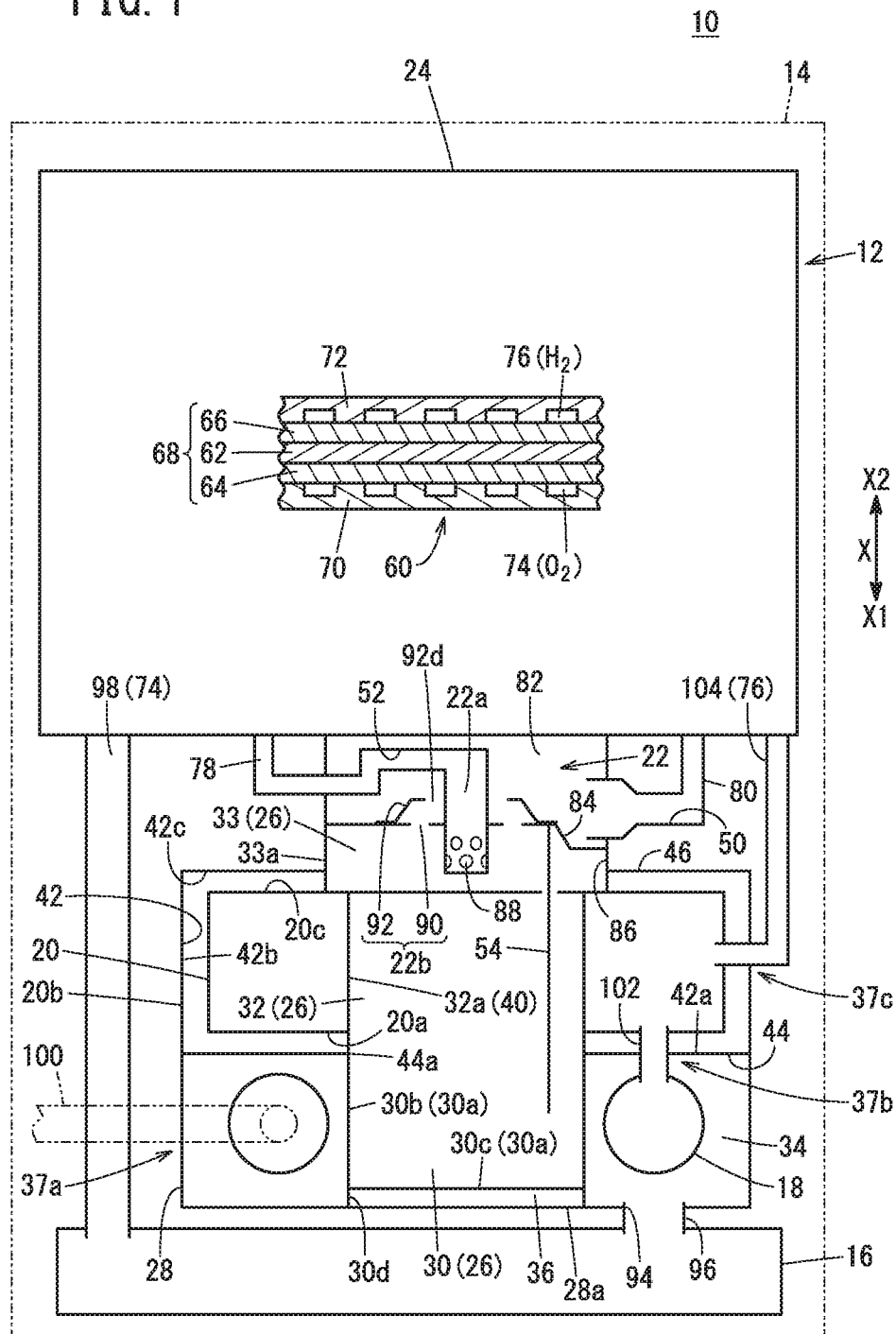
FIG. 1 is a view showing overall structure of a fuel cell module according to an embodiment of the present invention.

A preferred embodiment of a fuel cell module according to the present invention will be described in detail with reference to the accompanying drawings. In the drawings, the constituent elements which have the same or similar functions and which offer the same or similar advantages are labeled with the same reference numerals, and description of such constituent elements may not be repeated.

As shown in FIG. 1, although the embodiment of the present invention will be described in connection with the case where a fuel cell module 10 is used in a stationary application as an example, it is not essential to use the fuel cell module 10 in the stationary application specially. The fuel cell module 10 can be used in various applications such as in-vehicle applications. As a whole, the fuel cell module 10 includes a fuel cell unit 12, e.g., having a substantially rectangular parallel piped shape, and a casing 14 containing the fuel cell unit 12. Further, a heat insulating layer (not shown) is provided between the fuel cell unit 12 and the casing 14.

As shown in FIG. 1, in the fuel cell unit 12, a heat exchanger 16, an evaporator 18, a reformer 20, a combustor 22, and a fuel cell 24 are provided substantially in this order from the lower side (in a direction indicated by an arrow X1) to the upper side (in a direction indicated by an arrow X2) in the vertical direction (indicated by an arrow X). The fuel cell unit 12 further includes an exhaust gas combustion chamber 26 accommodating the combustor 22, and an auxiliary device case 28 accommodating the evaporator 18 and the reformer 20.

Figure 4:
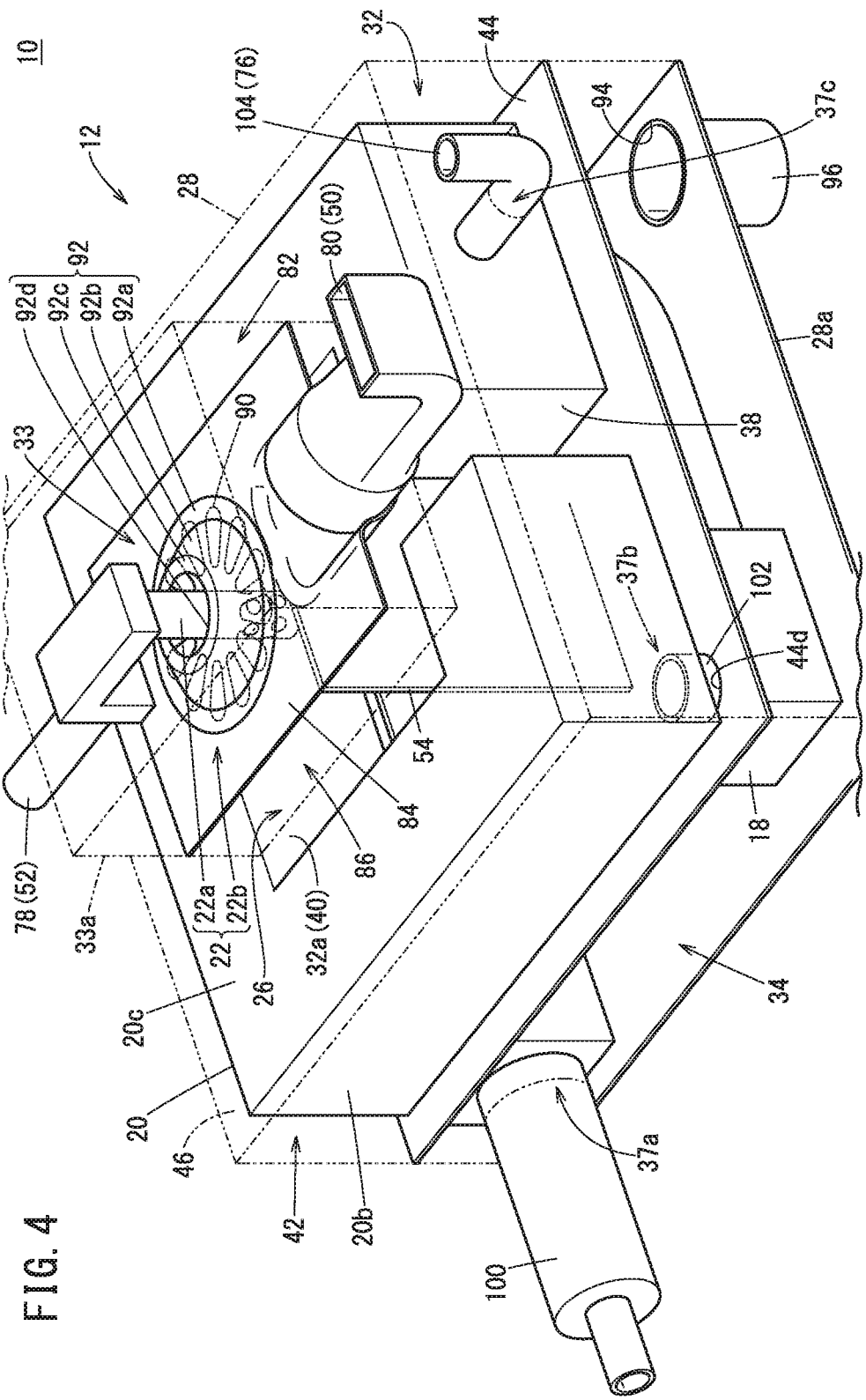
FIG. 4 is a perspective view illustrating the auxiliary device case and the exhaust gas combustion chamber entirely.

As shown in FIG. 4, as viewed in the vertical direction, the exhaust gas combustion chamber 26 is provided at substantially the center of the fuel cell unit 12. Further, as shown in FIG. 1, as viewed in the vertical direction of the fuel cell unit 12, the exhaust gas combustion chamber 26 is provided between the fuel cell 24 and the heat exchanger 16. Specifically, the exhaust gas combustion chamber 26 includes a first chamber 30, a second chamber 32, and a third chamber 33 that are connected together. The first chamber 30, the second chamber 32, and the third chamber 33 are arranged in this order from the lower side (indicated by the arrow X1) toward the upper side (indicated by the arrow X2) in the vertical direction. Stated otherwise, the direction in which the first chamber 30, the second chamber 32, and the third chamber 33 are arranged is oriented in the vertical direction (indicated by the arrow X).

Figure 3:
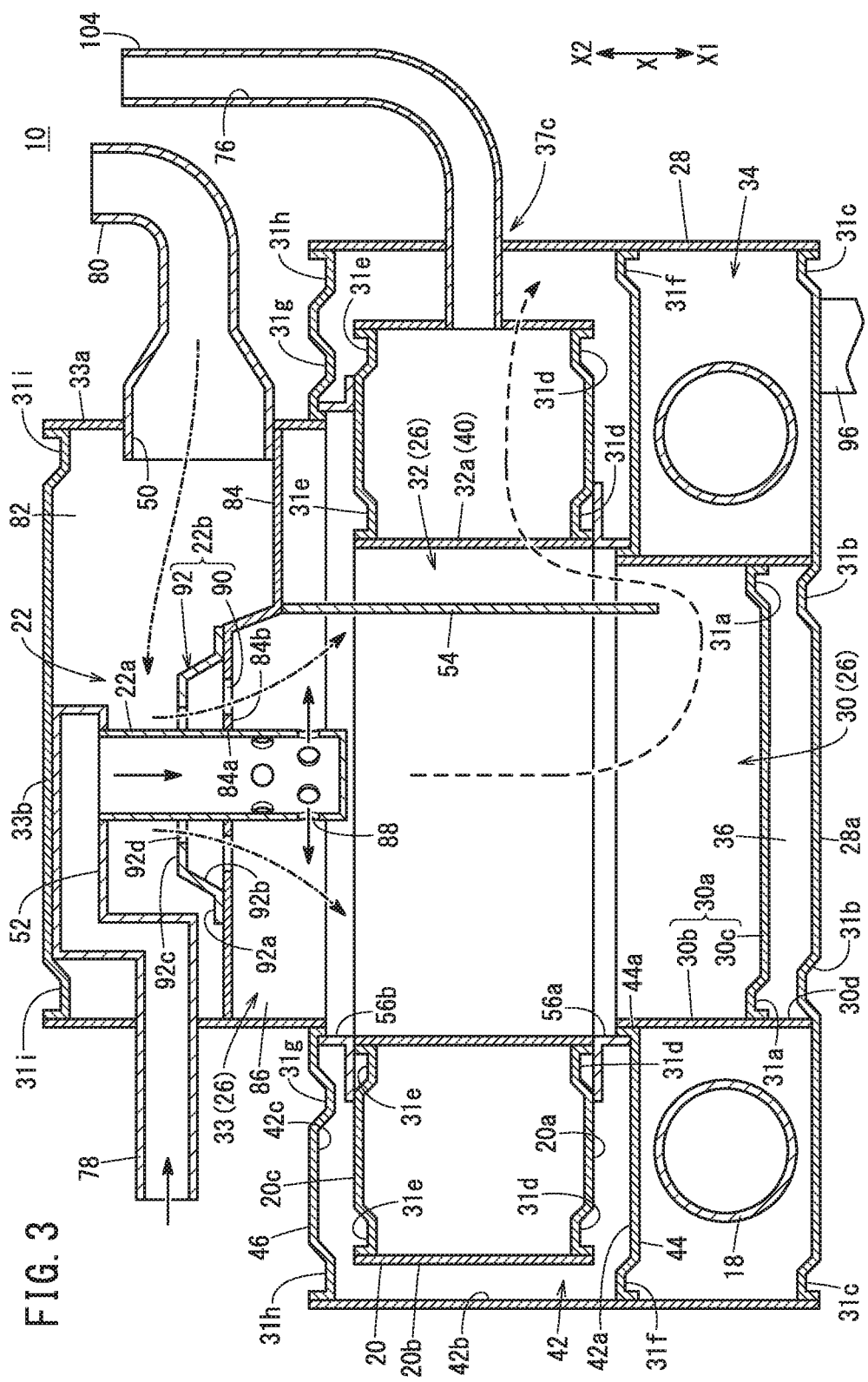
FIG. 3 is a cross sectional view illustrating the principal parts of the inside of an auxiliary device case and the inside of an exhaust gas combustion chamber.
Figure 5:
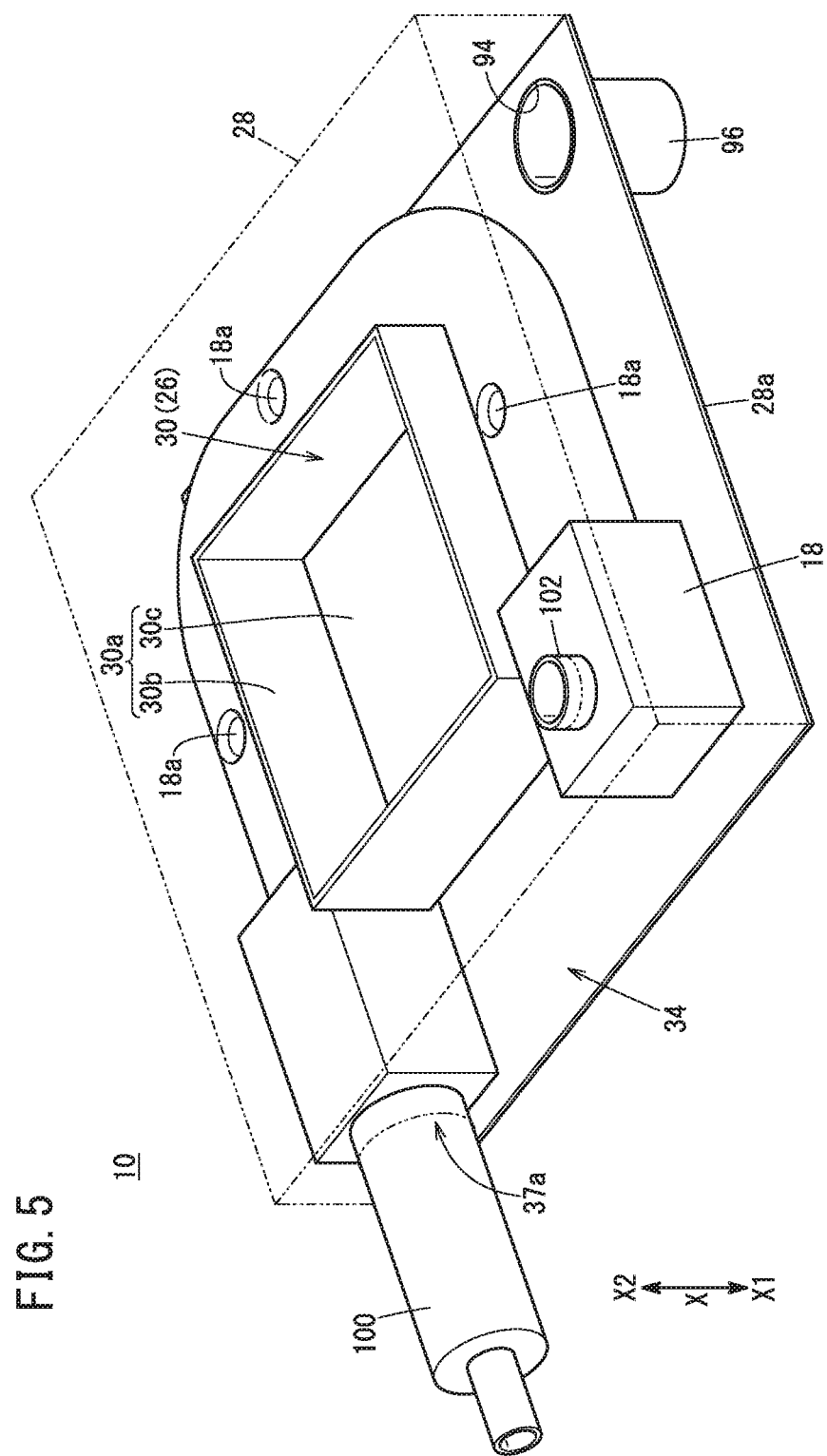
FIG. 5 is a perspective view illustrating the inside of an evaporator accommodation chamber.

In the embodiment of the present invention, as shown in FIGS. 3 and 5, a first wall 30a forming the first chamber 30 has a case shape which is open at the top and closed at the bottom. That is, the first wall 30a includes a first outer peripheral wall 30b and a first bottom wall 30c. As shown in FIG. 5, three out of four outer wall surfaces forming the first outer peripheral wall 30b are provided to face the evaporator 18 with clearance.

Therefore, as viewed in the vertical direction, the evaporator 18 has a U-shape (or C-shape) which surrounds three outer wall surfaces of the first outer peripheral wall 30b. Further, a plurality of (three, in the embodiment) first positioning sections 18a having a recessed shape are provided in an upper wall of the evaporator 18 at intervals in the direction in which the evaporator 18 extends. The details of the first positioning sections 18a will be given below.

As shown in FIG. 3, an uneven section 31a for absorbing heat deformation of the first bottom wall 30c is provided in the outer marginal portion of the first bottom wall 30c. In the embodiment of the present invention, the uneven section 31a has a groove shape provided along the outer marginal portion of the first bottom wall 30c in a manner as to be depressed toward the inside of the first chamber 30 (exhaust gas combustion chamber 26). However, the uneven section 31a is not limited to have the above structure as long as the uneven section 31a has the shape and the layout such that generation of thermal stress can be suppressed even if the temperature of the first bottom wall 30c, etc. changes. The same applies to uneven sections 31b to 31i described below. The uneven sections 31b to 31i should have the shape and the layout, with respect to the walls in which the uneven sections 31b to 31i are provided, such that generation of the thermal stress due to the temperature change can be suppressed. It should be noted that the uneven sections 31a to 31i are not illustrated in the drawings other than FIG. 3.

The first chamber 30 (first wall 30a) and the evaporator 18 are accommodated in an evaporator accommodation chamber 34 provided at the bottom of the auxiliary device case 28. As shown in FIGS. 1 and 3, protrusions 30d are provided partially (e.g., at four corners as viewed in the vertical direction) at the lower end of the first outer peripheral wall 30b of the first chamber 30, in a manner to protrude below the first bottom wall 30c.

The protrusion 30d contacts a bottom wall 28a of the auxiliary device case 28 to form a space 36 between the first bottom wall 30c of the first chamber 30 and the bottom wall 28a of the auxiliary device case 28. The first bottom wall 30c and the auxiliary device case 28 are not connected (joined) together and merely contact each other through the protrusion 30d so as to be movable relative to each other. The bottom wall 28a of the auxiliary device case 28 is provided with the uneven sections 31b, 31c for absorbing heat deformation of the auxiliary device case 28, etc. respectively in the inner marginal portion which contacts the protrusion 30d and the outer marginal portion of the bottom wall 28a.

As shown in FIG. 5, the auxiliary device case 28 (peripheral wall of the evaporator accommodation chamber 34) surrounds the outer periphery of the evaporator 18 with clearance. Further, only part of the bottom of the evaporator 18 contacts the bottom wall 28a of the auxiliary device case 28. The bottom wall 28a of the auxiliary device case 28 and part of the bottom of the evaporator 18 are not connected (joined) together and merely contact each other so as to be movable relative to each other. As described later, the evaporator 18 and the auxiliary device case 28 are connected together only by a first connector section 37a which is a section connecting a raw fuel inlet pipe 100 connected to the evaporator 18 described later and a side wall (peripheral wall) of the auxiliary device case 28 (evaporator accommodation chamber 34).

Figure 7:
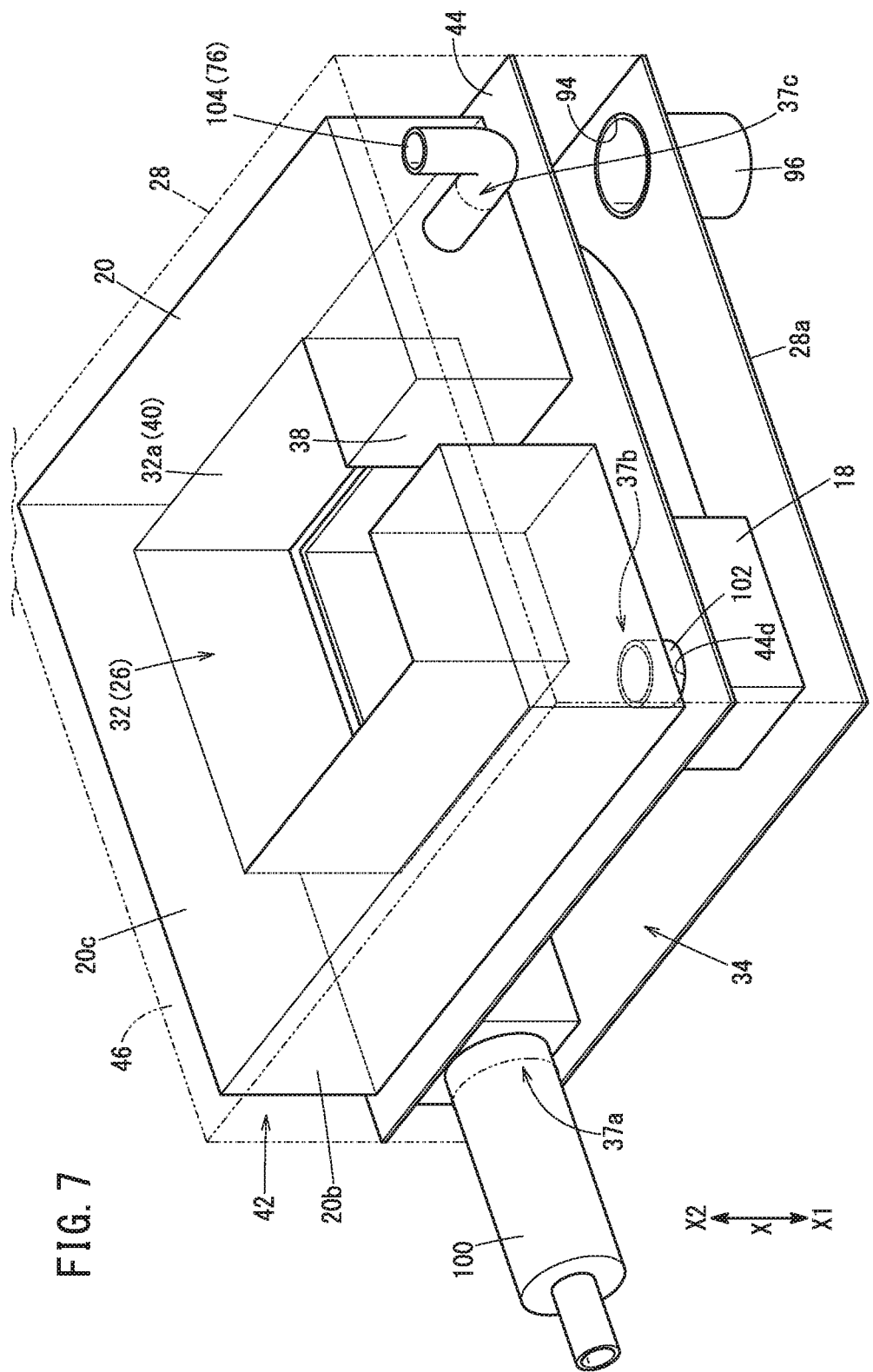
FIG. 7 is a perspective view illustrating the inside of a reformer accommodation chamber.

In the embodiment of the present invention, as shown in FIGS. 3 and 7, a second wall 32a (wall) forming the second chamber 32 has a substantially rectangular cylindrical shape which is open at the top and the bottom. Further, as shown in FIG. 7, a combustion chamber outlet 38 in the form of a slit extending along the vertical direction (indicated by the arrow X) is provided in part of the second wall 32a in the peripheral direction. The entire second wall 32a is a common wall 40 shared with the reformer 20. That is, the second wall 32a (common wall 40) forms the second chamber 32 of the exhaust gas combustion chamber 26, and forms the inner peripheral wall of the reformer 20.

Therefore, as viewed in the vertical direction, the reformer 20 according to the embodiment of the present invention has a frame shape (C-shape or U-shape) extending around the outer periphery of the second chamber 32 except for the combustion chamber outlet 38. Further, both ends of the reformer 20 in the direction in which the reformer 20 extends (peripheral direction) are spaced from each other, and the combustion chamber outlet 38 is provided between the both ends. As shown in FIG. 3, the uneven sections 31d, 31e for absorbing heat deformation of the wall the reformer 20 are provided in the marginal portion of the bottom wall and the marginal portion of the upper wall of the reformer 20, respectively.

As shown in FIGS. 3 and 7, the second chamber 32 and the reformer 20 are accommodated in a reformer accommodation chamber 42 provided inside the auxiliary device case 28. The inside of the auxiliary device case 28 is divided into the upper and lower portions in the vertical direction by a compartment wall 44, and the evaporator accommodation chamber 34 is formed on the lower side, and the reformer accommodation chamber 42 is formed on the upper side.

Figure 6:
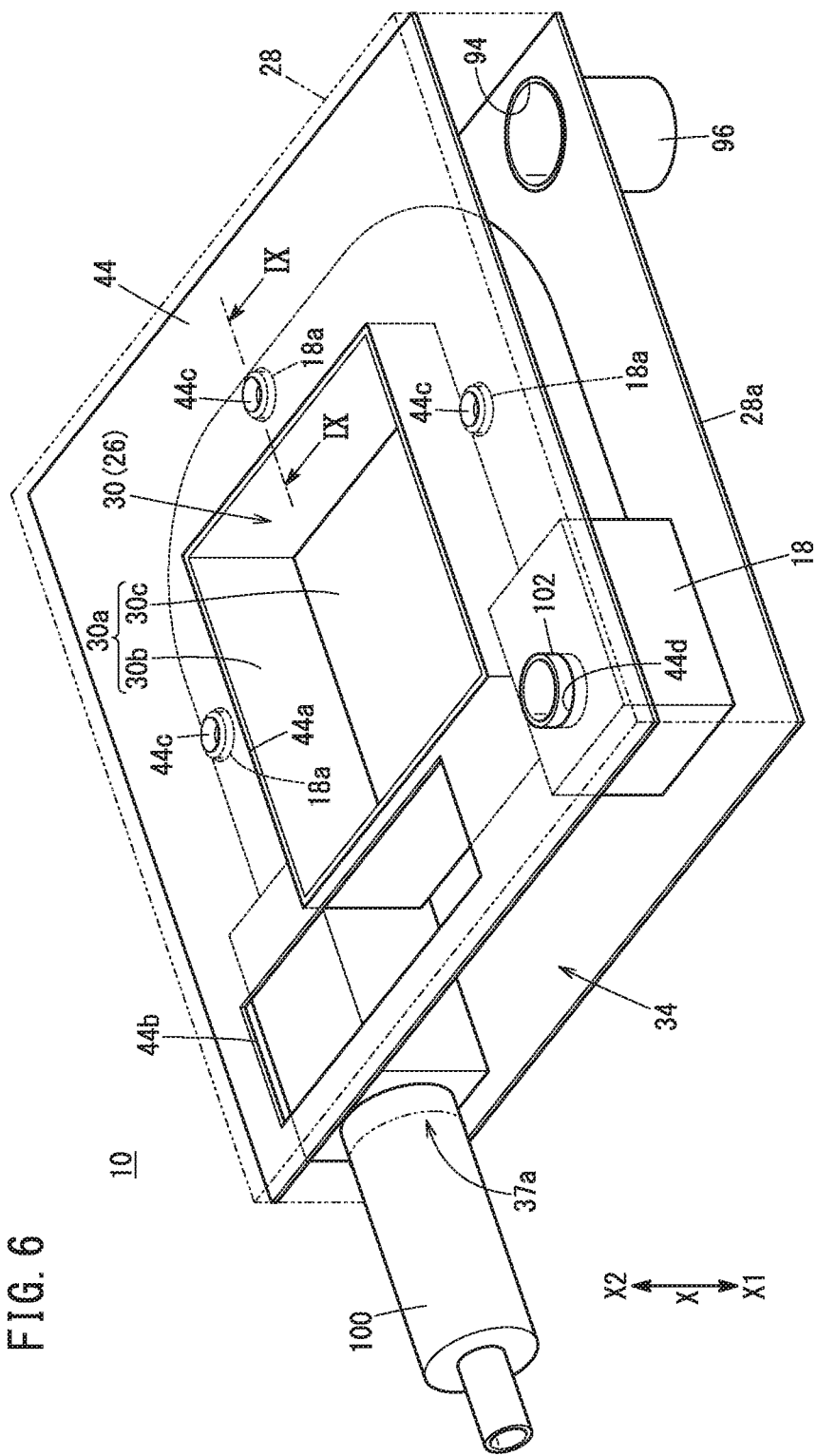
FIG. 6 is a perspective view illustrating a compartment wall.

As shown in FIG. 6, the compartment wall 44 has a frame shape where an opening 44a for connecting the second chamber 32 and the first chamber 30 is provided at substantially the center as viewed in the vertical direction. That is, as shown in FIG. 3, the compartment wall 44 is provided at the bottom of the reformer accommodation chamber 42 on the outer peripheral side of the first chamber 30. The compartment wall 44 is provided with an accommodation chamber connection port 44b connecting the reformer accommodation chamber 42 (FIGS. 3 and 7) and the evaporator accommodation chamber 34. As shown in FIG. 3, the uneven section 31f for absorbing heat deformation of the compartment wall 44 is provided in the outer marginal portion of the compartment wall 44.

Figure 9:
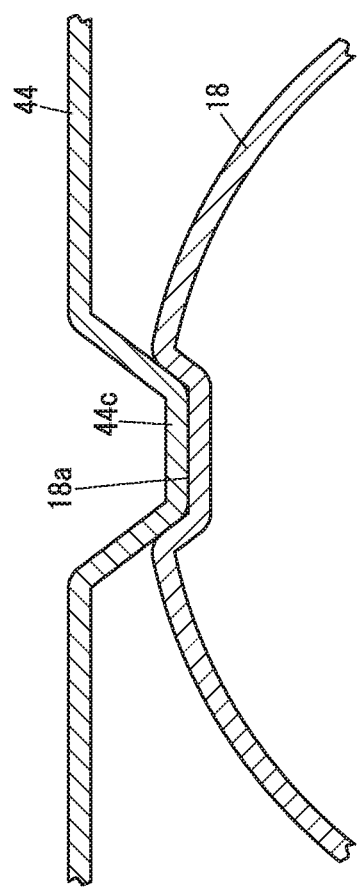
FIG. 9 is a cross sectional view taken along a line IX-IX indicated by an arrow in FIG. 6.

As shown in FIGS. 6 and 9, the compartment wall 44 is provided with second positioning sections 44c for positioning the evaporator 18 and the compartment wall 44 by being brought into contact with the first positioning sections 18a provided on the upper wall of the evaporator 18. The first positioning sections 18a and the second positioning sections 44c are not connected (joined) together and merely contact each other so as to be movable relative to each other. Further, the number and the shape of the first positioning sections 18a and the second positioning sections 44c are not limited specifically. For example, only a pair of, or a plurality of pairs other than three pairs of the first positioning sections 18a and the second positioning sections 44c may be provided, between the evaporator 18 and the compartment wall 44. Further, the first positioning sections 18a may have a ridge shape instead of the recessed shape.

As shown in FIGS. 3 and 4, the upper part of the reformer accommodation chamber 42 is closed by an upper wall 46. Therefore, in the reformer accommodation chamber 42, as viewed in the vertical direction, the portion excluding the second chamber 32 is covered with the frame shaped upper wall 46. As shown in FIG. 3, the uneven sections 31g, 31h for absorbing heat deformation of the upper wall 46 are provided in the inner marginal portion and the outer marginal portion of the upper wall 46 of the auxiliary device case 28, respectively.

In the reformer accommodation chamber 42, the outer wall surfaces (an outer bottom surface 20a, an outer peripheral surface 20b, an outer upper surface 20c) of the reformer 20 excluding the surface of the common wall 40 and the inner wall surfaces (an inner bottom surface 42a, an inner peripheral surface 42b, an inner upper surface 42c) of the reformer accommodation chamber 42, are provided spaced from each other to form a space between the outer wall surfaces and the inner wall surfaces. That is, the auxiliary device case 28 (peripheral wall of the reformer accommodation chamber 42) surrounds the outer periphery of the reformer 20 with clearance.

A lower end side (indicated by the arrow X1) of a third wall 33a of the third chamber 33 is coupled to an upper end side (indicated by the arrow X2) of the auxiliary device case 28. The third wall 33a has a case shape which is open at the bottom and closed at the top. The lower end (end on the side indicated by the arrow X1) of the third wall 33a is connected to the inner marginal portion (opening marginal portion) of the upper wall 46 having the frame shape. In the structure, the third chamber 33 inside the third wall 33a and the second chamber 32 inside the second wall 32a are connected together.

The combustor 22, part of an oxygen-containing exhaust gas channel 50 for supplying an oxygen-containing exhaust gas described later to the combustor 22, and part of a fuel exhaust gas channel 52 for supplying a fuel exhaust gas described later to the combustor 22 are provided inside the third chamber 33. It should be noted that the details of the inside of the third chamber 33 will be given later. As shown in FIG. 3, the uneven section 31i for absorbing heat deformation of an upper wall 33b is provided in the outer marginal portion of the upper wall 33b of the third wall 33a.

A guide wall 54 extending in the vertical direction is provided in the exhaust gas combustion chamber 26 from the third chamber 33 to the first chamber 30 through the second chamber 32. It should be noted that, in FIGS. 5 to 7, illustration of the guide wall 54 is omitted. In the embodiment of the present invention, one guide wall 54 is provided inside the exhaust gas combustion chamber 26, adjacent to the combustion chamber outlet 38 (FIGS. 4 and 7). The position where the guide wall 54 is provided, and the number of the guide walls 54 are not limited specially. A plurality of the guide walls 54 may be provided. Further, as long as the guide wall 54 extends in the vertical direction as a whole, curved portions or inclined portions (not shown) may be provided therein.

As shown in FIG. 3, in the auxiliary device case 28, interruption members 56a, 56b are provided between the upper end of the first wall 30a and the lower end of the second wall 32a, and between the upper wall of the second wall 32a and the lower end of the third wall 33a, respectively. The connection between the inside of the exhaust gas combustion chamber 26 and the inside of the auxiliary device case 28 is interrupted by these interruption members 56a, 56b. Further, the interruption member 56a provided between the upper end of the first wall 30a and the lower end of the second wall 32a is also interposed between the outer bottom surface 20a of the reformer 20 and the inner bottom surface 42a of the reformer accommodation chamber 42 (upper surface of the compartment wall 44). In the structure, the state where the outer bottom surface 20a of the reformer 20 and the inner bottom surface 42a of the reformer accommodation chamber 42 are spaced from each other is maintained.

As shown in FIG. 1, the fuel cell 24 is provided above the third chamber 33 (on the side indicated by the arrow X2). The fuel cell 24 is a solid oxide fuel cell (SOFC). In the embodiment of the present invention, the fuel cell 24 is in the form of a stack formed by stacking a plurality of flat plate type power generation cells 60 in the vertical direction (indicated by the arrow X). It should be noted that the fuel cell 24 may be formed by electrically connecting together a plurality of cylindrical power generation cells (not shown).

For example, each of the power generation cells 60 includes an electrolyte electrode assembly 68 (MEA) including a cathode 64 and an anode 66 provided on both surfaces of an electrolyte 62 made of oxide ion conductor such as stabilized zirconia. A cathode separator 70 and an anode separator 72 are provided on both sides of the electrolyte electrode assembly 68. An oxygen-containing gas channel 74 for supplying the oxygen-containing gas containing oxygen ($O_2$) such as the air to the cathode 64 is partially formed on the cathode separator 70. A fuel gas channel 76 for supplying the fuel gas containing hydrogen ($H_2$) to the anode 66 is partially formed on the anode separator 72.

In the fuel cell 24, the fuel gas supplied to the anode 66 through the fuel gas channel 76 and the oxygen-containing gas supplied to the cathode 64 through the oxygen containing gas channel 74 are partially consumed in electrochemical reactions to perform power generation. The fuel exhaust gas as a residual fuel gas which has not been consumed in the electrochemical reaction is discharged into a fuel exhaust gas pipe 78 forming part of the fuel exhaust gas channel 52. The oxygen-containing exhaust gas as a residual oxygen-containing gas which has not been consumed in the electrochemical reaction is discharged into an oxygen-containing exhaust gas pipe 80 forming part of the oxygen-containing exhaust gas channel 50.

As shown in FIG. 3, the downstream side of the oxygen-containing exhaust gas pipe 80 penetrates through the third wall 33a of the third chamber 33 in a substantially horizontal direction, and opened to a channel space 82 in the third chamber 33. The channel space 82 is space forming part of the oxygen-containing exhaust gas channel 50 inside the third chamber 33. That is, the oxygen-containing exhaust gas discharged from the fuel cell 24 (FIG. 1) flows into the channel space 82 in the third chamber 33 through the oxygen-containing exhaust gas pipe 80.

On the other hand, the downstream side of the fuel exhaust gas pipe 78 penetrates through the third wall 33a of the third chamber 33 in the horizontal direction, and is connected to a fuel exhaust gas nozzle 22a of the combustor 22 at an upper position in the third chamber 33 (channel space 82). That is, the fuel exhaust gas discharged from the fuel cell 24 is supplied to the fuel exhaust gas nozzle 22a through the fuel exhaust gas pipe 78. In this manner, the fuel exhaust gas channel 52 is partially provided inside the third chamber 33.

Figure 8:
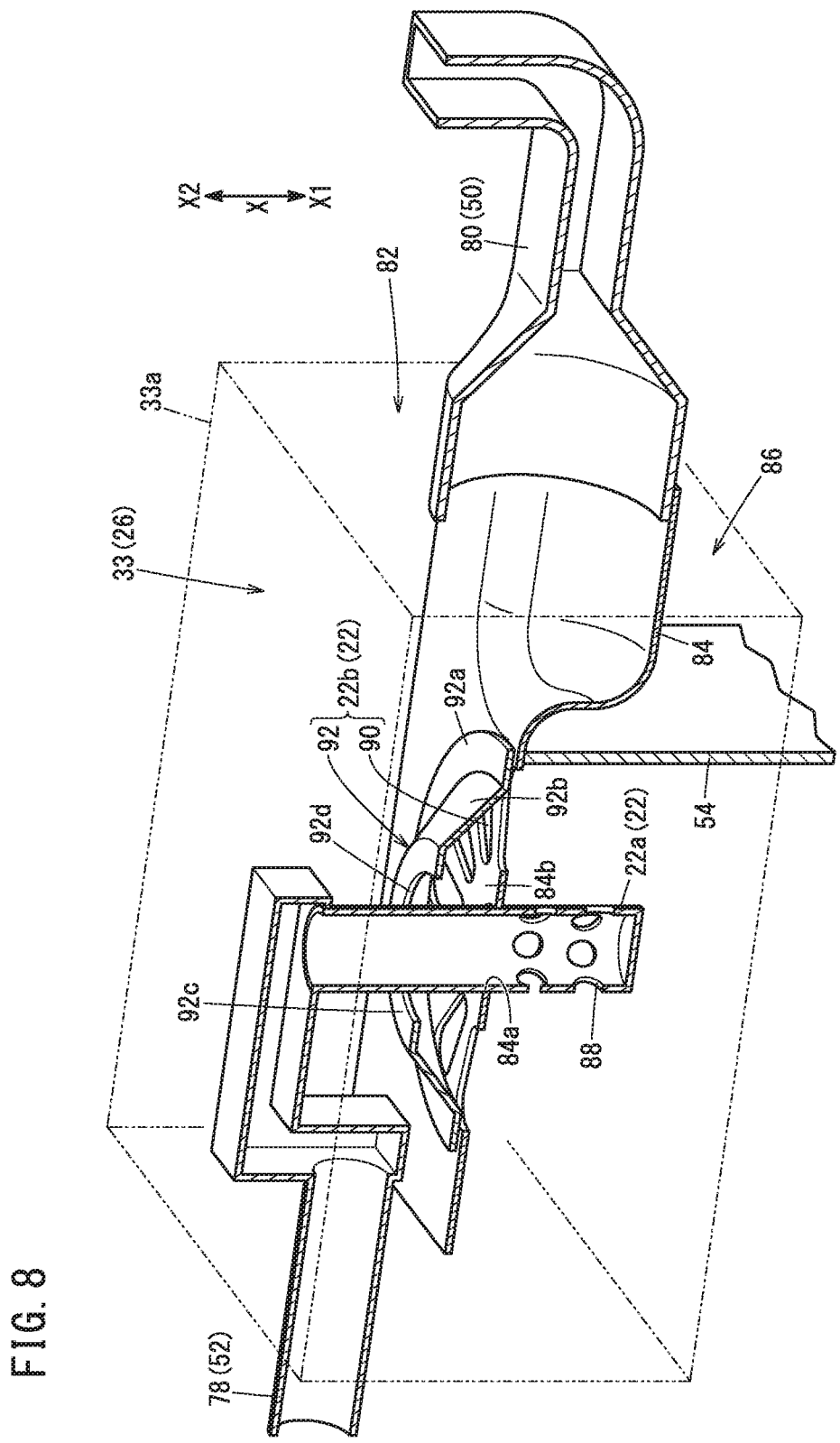
FIG. 8 is a perspective view illustrating a third chamber.

The inside of the third chamber 33 is divided by a partition plate 84 in an upper/lower direction. The channel space 82 is formed above the partition plate 84, and a combustion space 86 connected to the second chamber 32 is formed below the partition plate 84. As shown in FIGS. 3 and 8, the fuel exhaust gas nozzle 22a of the combustor 22 is inserted into an insertion hole 84a penetrating through the partition plate 84 to extend in the vertical direction over the channel space 82 and the combustion space 86. Therefore, the downstream side of the fuel exhaust gas nozzle 22a is provided in the combustion space 86. For example, the outer diameter of the fuel exhaust gas nozzle 22a and the diameter of the insertion hole 84a of the partition plate 84 are set to have substantially the same size. Therefore, the portion between the outer peripheral surface of the fuel exhaust gas nozzle 22a and the inner peripheral surface of the insertion hole 84a of the partition plate 84 is air-tight.

The fuel exhaust gas nozzle 22a has a cylindrical shape having a closed lower end. Further, a plurality of fuel exhaust gas injection holes 88 are formed in the portion of the fuel exhaust gas nozzle 22*a* provided in the combustion space 86. The fuel exhaust gas injection holes 88 penetrate through the peripheral wall of the fuel exhaust gas nozzle 22*a*. Therefore, as shown by arrows indicated by solid lines in FIG. 3, the fuel exhaust gas supplied from the fuel exhaust gas channel 52 in the fuel exhaust gas pipe 78 to the fuel exhaust gas nozzle 22*a* is injected from the fuel exhaust gas injection holes 88 to the inside of the combustion space 86 in the substantially horizontal direction.

The combustor 22 combusts the oxygen-containing exhaust gas and the fuel exhaust gas inside the exhaust gas combustion chamber 26 (the first chamber 30, the second chamber 32, the combustion space 86 of the third chamber 33) to produce the combustion exhaust gas, and has an oxygen-containing exhaust gas rectifier unit 22*b* and an igniter (not shown) in addition to the above-described fuel exhaust gas nozzle 22*a*. The oxygen-containing exhaust gas rectifier unit 22*b* includes oxygen-containing exhaust gas injection holes 90 formed to penetrate through the partition plate 84, and a rectifier cover 92 covering the oxygen-containing exhaust gas injection holes 90 in the channel space 82.

A plurality of the oxygen-containing exhaust gas injection holes 90 are provided in the marginal portion on the outer peripheral side of the insertion hole 84*a* of the partition plate 84 at intervals from each other in the circumferential direction, to connect the inside of the rectifier cover 92 and the combustion space 86. As shown in FIGS. 4 and 8, preferably, as viewed in the vertical direction, the oxygen-containing exhaust gas injection holes 90 each have an oval shape such that the radius of curvature thereof on the central side is smaller than the radius of curvature thereof on the outer side in the radial direction of the insertion hole 84*a* (FIG. 8).

These oxygen-containing exhaust gas injection holes 90 are provided outside the insertion hole 84*a* in the radial direction with clearance from the insertion hole 84*a*, in the partition plate 84. Therefore, a plate shaped portion 84*b* is provided between the insertion hole 84*a* of the partition plate 84 and the oxygen-containing exhaust gas injection holes 90.

As shown in FIG. 8, the rectifier cover 92 is provided with a flange 92*a* at the lower end, a tapered portion 92*b* having a diameter decreased from the inner marginal portion of the flange 92*a* toward the upper side, and an upper wall 92*c* having a doughnut shape (ring shape) extending from the upper end of the tapered portion 92*b* toward the central side in the radial direction, the flange 92*a*, the tapered portion 92*b*, and the upper wall 92*c* being formed integrally. It should be noted that the flange 92*a*, the tapered portion 92*b*, and the upper wall 92*c* may be made of the same material integrally, or may be formed as separate members and joined together afterward.

The lower surface of the flange 92*a* of the rectifier cover 92 contacts the partition plate 84, on the outer peripheral side of the oxygen-containing exhaust gas injection holes 90. The fuel exhaust gas nozzle 22*a* is inserted into an opening provided at the center of the upper wall 92*c* in the radial direction. The diameter of the opening of the upper wall 92*c* is larger than the outer diameter of the fuel exhaust gas nozzle 22*a*. In the structure, an oxygen-containing exhaust gas inlet 92*d* is formed between the outer peripheral surface of the fuel exhaust gas nozzle 22*a* and the inner peripheral surface of the opening of the upper wall 92*c*. The oxygen-containing exhaust gas inlet 92*d* allows the oxygen-containing exhaust gas in the channel space 82 to flow into a portion between the rectifier cover 92 and the partition plate 84.

As viewed in the vertical direction, the majority part of the oxygen-containing exhaust gas inlet 92*d* faces the plate shaped portion 84*b* of the partition plate 84. Further, the oxygen-containing exhaust gas which flowed from the oxygen-containing exhaust gas inlet 92*d* flows downward along the tapered portion 92*b* toward the outside in the radial direction. In the structure, as denoted by arrows indicated by one dot chain lines in FIG. 3, the oxygen-containing exhaust gas injected from the oxygen-containing exhaust gas injection holes 90 to the combustion space 86 flows toward the outside in the radial direction of the fuel exhaust gas nozzle 22*a* while spreading downward.

The igniter is provided adjacent to the fuel exhaust gas injection holes 88 and the oxygen-containing exhaust gas injection holes 90 in the combustion space 86. Further, for example, at the time of starting operation of the fuel cell module 10, the igniter causes the fuel exhaust gas injected from the fuel exhaust gas injection holes 88 and the oxygen-containing exhaust gas injected from the oxygen-containing exhaust gas injection holes 90 to ignite to start combustion reaction. It should be noted that, as an igniter, an ignition device and/or an ignition heater may be used.

In the manner as described above, in the combustor 22, the oxygen-containing exhaust gas and the fuel exhaust gas are injected toward the flame in the exhaust gas combustion chamber 26 to combust the oxygen-containing exhaust gas and the fuel exhaust gas. As a result, for example, the temperature of the exhaust gas combustion chamber 26 is increased to about 700° C., and the combustion exhaust gas at about 700° C. is produced. As shown by an arrow indicated by a broken line in FIG. 3, after the combustion exhaust gas is guided by the guide wall 54 to flow inside the exhaust gas combustion chamber 26 from the third chamber 33 into the first chamber 30 through the second chamber 32, the combustion exhaust gas is guided to the combustion chamber outlet 38 (FIGS. 4 and 7) provided in the second wall 32*a* of the second chamber 32. The combustion exhaust gas discharged from the exhaust gas combustion chamber 26 through the combustion chamber outlet 38 flows through the space formed between the outer wall surface of the reformer 20 and the inner wall surface of the reformer accommodation chamber 42 as described above to perform heat exchange with the reformer 20, and heat the reformer 20.

The combustion exhaust gas, which has been subjected to heat exchange with the reformer 20 in the reformer accommodation chamber 42, flows into the evaporator accommodation chamber 34 through the accommodation chamber connection port 44*b* (FIG. 6) provided in the compartment wall 44 of the auxiliary device case 28. In the evaporator accommodation chamber 34, the first chamber 30 and the evaporator 18 performs heat exchange with the combustion exhaust gas to keep the temperature of the exhaust gas combustion chamber 26 and heat the evaporator 18.

As shown in FIGS. 4 to 7, the combustion exhaust gas which has been subjected to heat exchange with the first chamber 30 and the evaporator 18 inside the evaporator accommodation chamber 34 is discharged from the evaporator accommodation chamber 34 through a combustion exhaust gas outlet 94 provided in the bottom wall 28*a* of the auxiliary device case 28. As shown in FIGS. 1 and 4 to 7, a combustion exhaust gas pipe 96 is connected to the combustion exhaust gas outlet 94. As shown in FIG. 1, the combustion exhaust gas pipe 96 connects the auxiliary device case 28 and the heat exchanger 16. That is, the combustion exhaust gas discharged from the evaporator accommodation chamber 34 is supplied to the heat exchanger 16 through the combustion exhaust gas pipe 96.

The heat exchanger 16 performs heat exchange between the oxygen-containing gas supplied from an oxygen-containing gas supply source (not shown) and the combustion exhaust gas supplied through the combustion exhaust gas pipe 96 as described above. In this manner, the oxygen-containing gas is preheated (heated) before it is supplied to the fuel cell 24. That is, the oxygen-containing gas preheated at the heat exchanger 16 is supplied to the fuel cell 24 through an oxygen-containing gas supply pipe 98 forming part of the oxygen-containing gas channel 74.

On the other hand, the raw fuel chiefly containing hydrocarbon such as a city gas or propane gas is supplied to the evaporator 18 from a fuel gas supply source (not shown), and water is supplied to the evaporator 18 from a water supply source (not shown). It should be noted that the raw fuel and water are supplied to the inside of the evaporator 18 through a common raw fuel inlet pipe 100 (FIG. 1 and FIGS. 4 to 7). The evaporator 18 performs heat exchange with the combustion exhaust gas in the evaporator accommodation chamber 34 as described above, whereby the raw fuel is preheated, and water is evaporated into water vapor. The operating temperature of the evaporator 18 is, e.g., about 100° C. to 200° C.

It should be noted that, as shown in FIGS. 4 to 7, the raw fuel inlet pipe 100 extends to penetrate through the side wall (peripheral wall) of the auxiliary device case 28 (evaporator accommodation chamber 34). At this penetrating part, the raw fuel inlet pipe 100 and the auxiliary device case 28 are connected together to form the first connector section 37a.

As shown in FIGS. 1 and 4 and 7, the water vapor obtained by the evaporator 18 and the raw fuel preheated by the evaporator 18 are supplied to the inside of the reformer 20 through a connection pipe 102 connecting the evaporator 18 and the reformer 20. The evaporator 18 and the reformer 20 are connected together only by a second connector section 37b through the connection pipe 102. Further, the connection pipe 102 is inserted into a through hole 44d provided in the compartment wall 44 (FIGS. 4, 6, and 7) in a manner to extend over the evaporator accommodation chamber 34 and the reformer accommodation chamber 42. However, the connection pipe 102 and the compartment wall 44 are not connected (joined) together.

In the reformer 20, steam reforming reaction for producing hydrogen from the water vapor and the raw fuel is induced to produce a fuel gas. When the temperature of the reformer 20 and a reforming catalyst (not shown) provided inside the reformer 20 is, e.g., about 600° C. to 700° C., it is possible to induce steam reforming reaction stably. Further, for example, since the steam reforming reaction is endothermic reaction, in order to produce the fuel gas suitably in the reformer 20, preferably, heat is applied continuously from the outside of the reformer 20.

In the embodiment of the present invention, as described above, it is possible to continuously apply heat to the reformer 20 from the outside, by heat exchange with the combustion exhaust gas inside the reformer accommodation chamber 42. Further, since the reformer 20 and the exhaust gas combustion chamber 26 have the common wall 40, it is possible to continuously apply the heat of the exhaust gas combustion chamber 26 to the reformer 20. As a result, it is possible to suitably induce steam reforming reaction, and obtain the fuel gas. The fuel gas obtained by the reformer 20 is supplied to the fuel cell 24 through a fuel gas supply pipe 104 which connects the reformer 20 and the fuel cell 24 to form part of the fuel gas channel 76.

As shown in FIG. 1, the upstream side of the fuel gas supply pipe 104 is connected to the reformer 20 inside the reformer accommodation chamber 42. Further, the downstream side of the fuel gas supply pipe 104 is connected to the fuel cell 24 outside the auxiliary device case 28 and inside the casing 14. As shown in FIGS. 1, 3, 4, and 7, the fuel gas supply pipe 104 penetrates through the side wall (peripheral wall) of the auxiliary device case 28 (reformer accommodation chamber 42), between the upstream side and the downstream side of the fuel gas supply pipe 104, and in this penetrating part, the fuel gas supply pipe 104 and the auxiliary device case 28 are connected together. The reformer 20 and the auxiliary device case 28 are connected together only by a third connector section 37c which is a section connecting the fuel gas supply pipe 104 and the side wall of the auxiliary device case 28.

Operation of the fuel cell module 10 basically having the above structure will be described in line with the flow of fluid flowing through the fuel cell unit 12.

Figure 2:
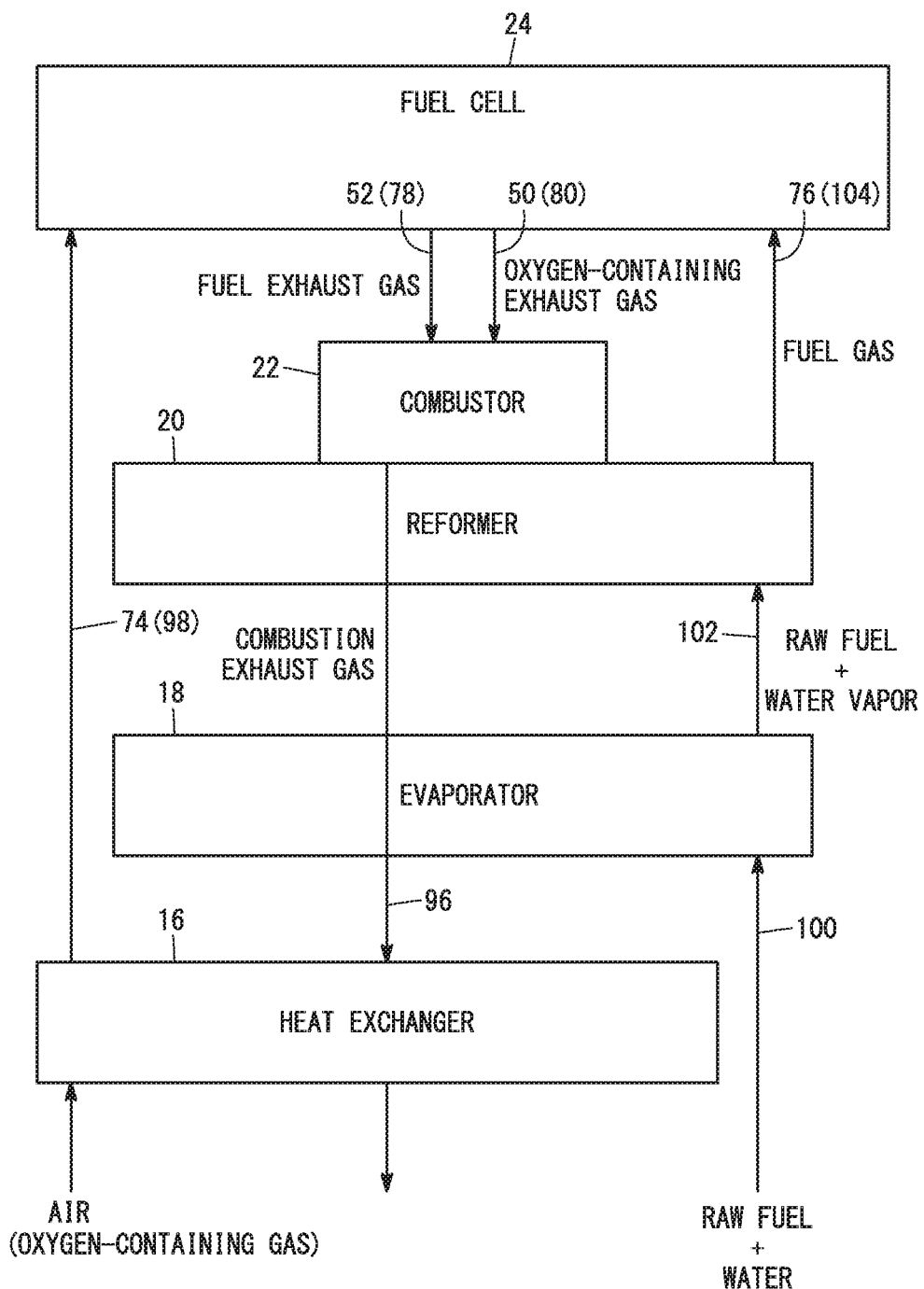
FIG. 2 is a block diagram illustrating flow of fluid in the fuel cell module in FIG. 1.

As shown in FIG. 2, during operation of the fuel cell module 10, an oxygen-containing gas is supplied from the oxygen-containing gas supply source to the heat exchanger 16 through an oxygen-containing gas inlet pipe (not shown). Further, the raw fuel from the fuel gas supply source and the water from the water supply source are supplied to the inside of the evaporator 18 through the raw fuel inlet pipe 100.

The oxygen-containing gas supplied to the heat exchanger 16 is heated by heat exchange with the combustion exhaust gas, and then, as shown in FIG. 1, flows through the oxygen-containing gas supply pipe 98, and is supplied to the oxygen-containing gas channel 74 provided in each of the power generation cells 60 of the fuel cell 24.

On the other hand, the raw fuel and water supplied to the inside of the evaporator 18 is heated by heat exchange with the combustion exhaust gas through the wall of the evaporator 18 in the evaporator accommodation chamber 34. As a result, the heated raw fuel and the water vapor produced by evaporating water flow through the connection pipe 102, and are supplied to the inside of the reformer 20.

In the reformer 20, the fuel gas is produced by inducing steam vapor reforming reaction of the raw fuel and the water vapor. At this time, the suitable operating temperature of the reformer 20 is maintained by heat exchange with the combustion exhaust gas in the reformer accommodation chamber 42 and transmission of heat of the exhaust gas combustion chamber 26 through the common wall 40. Further, as described above, since the raw fuel heated by the evaporator 18 is supplied to the reformer 20 together with the water vapor, it is possible to maintain the temperature of the reformer 20 at high temperature more suitably than in the case where non-heated raw fuel is supplied. The fuel gas obtained at the reformer 20 flows through the fuel gas supply pipe 104, and is supplied to the fuel gas channel 76 provided in each of the power generation cells 60 of the fuel cell 24.

In each of the power generation cells 60 of the fuel cell 24, electrochemical reactions of the oxygen-containing gas supplied from the oxygen-containing gas supply pipe 98 through the heat exchanger 16 and the fuel gas supplied from the fuel gas supply pipe 104 through the evaporator 18 and the reformer 20 are induced to perform power generation. Further, the oxygen-containing gas which has not been consumed in the electrochemical reactions is discharged as the oxygen-containing exhaust gas into the oxygen-containing exhaust gas pipe 80, and the fuel gas which has not been consumed in the electrochemical reaction is discharged as the fuel exhaust gas into the fuel exhaust gas pipe 78.

As shown in FIG. 3, the fuel exhaust gas discharged into the fuel exhaust gas pipe 78 flows through the downstream side of the fuel exhaust gas pipe 78 provided inside the third chamber 33 (channel space 82) of the exhaust gas combustion chamber 26, and is supplied to the fuel exhaust gas nozzle 22*a*. The fuel exhaust gas nozzle 22*a* injects the fuel exhaust gas from the fuel exhaust gas injection holes 88 to the inside of the combustion space 86 in the substantially horizontal direction.

In the meanwhile, the oxygen-containing exhaust gas discharged into the oxygen-containing exhaust gas pipe 80 flows into the channel space 82 forming part of the oxygen-containing exhaust gas channel 50 in the upper part in the third chamber 33. In the channel space 82, the oxygen-containing exhaust gas flows into a portion between the rectifier cover 92 and the partition plate 84 through the oxygen-containing exhaust gas inlet 92*d* provided in the rectifier cover 92. Then, the oxygen-containing exhaust gas is injected into the combustion space 86 provided in the lower part of the third chamber 33, through the oxygen-containing exhaust gas injection holes 90 provided in the partition plate 84.

As described above, since the oxygen-containing exhaust gas injected in this manner flows on the lower side, toward the outer side in the radial direction of the fuel exhaust gas nozzle 22*a*, it is possible to prevent the oxygen-containing exhaust gas from being blown toward the fuel exhaust gas injection holes 88. That is, in the exhaust gas combustion chamber 26, it is possible to suppress blow-out of the flame produced in combustion of the fuel exhaust gas, and suitably induce combustion reaction of the oxygen-containing exhaust gas and the fuel exhaust gas.

Further, as described above, the fuel exhaust gas injected from the fuel exhaust gas injection holes 88 and the oxygen-containing exhaust gas injected from the oxygen-containing exhaust gas injection holes 90 flow in the exhaust gas combustion chamber 26, and are combusted to produce the combustion exhaust gas. As described above, the guide wall 54 extending from the third chamber 33 to the first chamber 30 in the vertical direction is provided inside the exhaust gas combustion chamber 26.

By this guide wall 54, the fuel exhaust gas and the oxygen-containing exhaust gas are guided in a manner to flow from the upper side of the exhaust gas combustion chamber 26 (the combustion space 86 of the third chamber 33 and the second chamber 32) toward the first chamber 30 on the lower side, and combusted. That is, for example, the guide wall 54 can suppress movement of the fuel exhaust gas injected from the fuel exhaust gas injection holes 88 and the oxygen-containing exhaust gas injected from the oxygen-containing exhaust gas injection holes 90 directly toward the combustion chamber outlet 38 (FIGS. 4 and 7) of the second chamber 32.

The combustion exhaust gas produced in the exhaust gas combustion chamber 26 is discharged from the combustion chamber outlet 38 of the second chamber 32 shown in FIGS. 4 and 7 to a portion between the outer wall surface of the reformer 20 and the inner wall surface of the reformer accommodation chamber 42. In the reformer accommodation chamber 42, the combustion exhaust gas flows through the space formed between the outer wall surface of the reformer 20 and the inner wall surface of the reformer accommodation chamber 42. As a result, since heat exchange occurs between the reformer 20 and the combustion exhaust gas through outer wall surfaces (the outer bottom surface 20*a*, the outer peripheral surface 20*b*, and the outer upper surface 20*c*) of the reformer 20 excluding the surface of the common wall 40 in FIG. 3, the reformer 20 is heated efficiently.

The combustion exhaust gas which flowed through the reformer accommodation chamber 42 flows into the evaporator accommodation chamber 34 through the accommodation chamber connection port 44*b* of the compartment wall 44. As shown in FIG. 3, in the evaporator accommodation chamber 34, the combustion exhaust gas flows between the first outer peripheral wall 30*b* of the first chamber 30 and the evaporator 18, and through the space 36 between the first bottom wall 30*c* of the first chamber 30 and the inner bottom surface of the auxiliary device case 28. As a result, since the evaporator 18 is heated by heat exchange with the combustion exhaust gas, the raw fuel is heated and the water vapor is produced inside the evaporator 18, as described above. Further, the temperature of the exhaust gas combustion chamber 26 is maintained by heat exchange between the combustion exhaust gas and the first wall 30*a*.

After the combustion exhaust gas flowed through the evaporator accommodation chamber 34, the combustion exhaust gas flows from the combustion exhaust gas outlet 94 provided in the bottom wall 28*a* of the auxiliary device case 28 through the combustion exhaust gas pipe 96, and is supplied to the heat exchanger 16 in FIG. 1. The combustion exhaust gas which has been subjected to heat exchange with the oxygen-containing gas in the heat exchanger 16 to heat the oxygen-containing gas is then supplied to, e.g., a condenser (not shown), and after the water content contained in the combustion exhaust gas is collected, the combustion exhaust gas is discharged to the outside of the fuel cell module 10.

In this regard, as described above, the combustion exhaust gas is produced by inducing combustion reaction of the oxygen-containing exhaust gas and the fuel exhaust gas, and the content of the unconsumed fuel gas (fuel exhaust gas) is sufficiently small. Therefore, it is possible to easily suppress discharge of the unconsumed fuel gas together with the combustion exhaust gas.

As can be seen from the above, in the fuel cell module 10 according to the embodiment of the present invention, the reformer 20 and the evaporator 18 are operated at a temperature lower than the temperature of the exhaust gas combustion chamber 26. Therefore, by providing each of the reformer 20 and the evaporator 18 to surround at least part of the outer periphery of the exhaust gas combustion chamber 26, it is possible to transmit the heat of the exhaust gas combustion chamber 26 to the reformer 20 and the evaporator 18. Accordingly, since it is possible to suppress excessive increase in the temperature of the walls (the first wall 30*a*, the second wall 32*a*, and the third wall 33*a*), etc. of the exhaust gas combustion chamber 26, it is possible to suppress occurrence of the situation where the temperature of the walls, etc. of the exhaust gas combustion chamber 26 rises to a temperature (hereinafter also referred to as an "avoidance temperature") at which durability thereof is degraded, during operation of the fuel cell module 10.

Clearance is provided between the outer periphery of each of the reformer 20 and the evaporator 18, and the auxiliary device case 28. Further, the evaporator 18 has a shape where one end and the other end of the evaporator 18 in the direction in which the evaporator 18 extends are spaced from each other, and the reformer 20 has a shape where one end and the other end of the reformer 20 in the direction in which the reformer 20 extends are spaced from each other. Further, the evaporator 18 and the auxiliary device case 28 are connected together only by the first connector section 37a at one position, the evaporator 18 and the reformer 20 are connected together only by the second connector section 37b at one position, and the reformer 20 and the auxiliary device case 28 are connected together only by the third connector section 37c at one position. That is, each of the reformer 20, the evaporator 18, and the auxiliary device case 28 is bound to the requisite minimum degree.

As a result, in the auxiliary device case 28, each of the evaporator 18 and the reformer 20 tends to be deformed freely with small binding (deformed in a manner that generation of the stress is suppressed). Thus, even if thermal strain occurs due to the temperature change in each of the reformer 20, the evaporator 18, the auxiliary device case 28, the first connector section 37a, the second connector section 37b, the third connector section 37c, etc., it is possible to suppress generation of the thermal stress. Thus, in the fuel cell module 10, it is possible to suppress degradation in the durability due to the temperature change.

In the fuel cell module 10 according to the above embodiment, at least part of the walls forming the auxiliary device case 28 and the exhaust gas combustion chamber 26 (e.g., the bottom wall 28a, the first bottom wall 30c, the upper wall 33b, the compartment wall 44, the upper wall 46, the upper wall and the bottom wall, etc. of the reformer 20) is provided with the uneven sections 31a to 31i for absorbing heat deformation. In this case, even if the temperature of the walls forming the auxiliary device case 28 and the exhaust gas combustion chamber 26 is changed, since it is possible to suppress generation of the thermal stress in the auxiliary device case 28 and the walls, it is possible to increase the durability of the fuel cell module 10 more effectively.

In the fuel cell module 10 according to the embodiment describe above, the exhaust gas combustion chamber 26 has the first chamber 30 and the second chamber 32 connected to each other, and the combustion chamber outlet 38 configured to discharge the combustion exhaust gas in the exhaust gas combustion chamber 26, at least part of the outer wall surface of the first chamber 30 faces the evaporator 18 with clearance, the combustion exhaust gas discharged from the combustion chamber outlet 38 can flow between the outer wall surface of the first chamber 30 and the evaporator 18, and at least part of the second wall 32a (wall) forming the second chamber 32 is the common wall 40 shared with the reformer 20.

In this case, since the heat of the exhaust gas combustion chamber 26 is directly transmitted from the common wall 40 to the reformer 20, it is possible to effectively suppress increase in the temperature of the exhaust gas combustion chamber 26 in excess of the temperature of the reformer 20, i.e., it is possible to suppress occurrence of the situation where the temperature of the exhaust gas combustion chamber 26 reaches the avoidance temperature. In this regard, since the reformer 20 is operated in a predetermined high temperature range which is lower than the avoidance temperature, it is possible to suppress excessive decrease in the temperature of the exhaust gas combustion chamber 26. Further, it is possible to utilize the heat of the exhaust gas combustion chamber 26 to heat the reformer 20. It should be noted that, in the embodiment as described above, although the exhaust gas combustion chamber 26 includes the third chamber 33, the exhaust gas combustion chamber 26 may not include the third chamber 33, and the second chamber 32 may be provided with the combustor 22.

Further, since the combustion exhaust gas flows between the evaporator 18 and the outer wall surface of the first chamber 30 of the exhaust gas combustion chamber 26, the combustion exhaust gas, the temperature of which has been decreased by heat exchange with the evaporator 18 having the low operating temperature in comparison with the reformer 20, etc., can be further subjected to heat exchange with the first chamber 30. Also in this case, it is possible to effectively suppress occurrence of the situation where the exhaust gas combustion chamber 26 reaches the avoidance temperature. In this regard, since the outer wall surface of the first chamber 30 and the evaporator 18 are disposed spaced from each other, it is possible to suppress occurrence of the situation where the wall of the exhaust gas combustion chamber 26 is cooled excessively by the evaporator 18.

In the fuel cell module 10 according to the embodiment as described above, the auxiliary device case 28 includes the evaporator accommodation chamber 34 configured to accommodate the first chamber 30 and the evaporator 18, the reformer accommodation chamber 42 configured to accommodate the second chamber 32 and the reformer 20, and the compartment wall 44 configured to separate the evaporator accommodation chamber 34 from the reformer accommodation chamber 42. The second chamber 32 is provided with the combustion chamber outlet 38, and the combustion chamber outlet 38 is configured to enable the combustion exhaust gas in the exhaust gas combustion chamber 26 to flow between an outer wall surface of the reformer 20 and an inner wall surface of the reformer accommodation chamber 42. The compartment wall 44 is provided with the accommodation chamber connection port 44b configured to enable the combustion exhaust gas, which has been subjected to heat exchange with the reformer 20 in the reformer accommodation chamber 42, to flow through the evaporator accommodation chamber 34, and the evaporator accommodation chamber 34 is provided with the combustion exhaust gas outlet 94 configured to discharge the combustion exhaust gas, which has been subjected to heat exchange with the first chamber 30 and the evaporator 18, from the evaporator accommodation chamber 34.

In this case, after the temperature of the hot combustion exhaust gas which flowed out of the combustion chamber outlet 38 is decreased by heat exchange with the reformer 20 at the reformer accommodation chamber 42, the combustion exhaust gas can flows into the evaporator accommodation chamber 34 through the accommodation chamber connection port 44b. Therefore, in the evaporator accommodation chamber 34, after the temperature of the combustion exhaust gas is decreased as described above, heat exchange between the combustion exhaust gas and the first chamber 30 can be performed. As a result, it is possible to more effectively suppress occurrence of the situation where the exhaust gas combustion chamber 26 reaches the avoidance temperature. Further, it is possible to utilize the heat of the exhaust gas combustion chamber 26 to suitably heat the reformer 20 and the evaporator 18.

In the fuel cell module 10 according to the embodiment as described above, the combustion chamber outlet 38 is provided between both ends of the reformer 20, and the entire peripheral wall forming the second chamber 32 and the entire inner peripheral wall of the reformer 20 form the common wall 40. In this case, since the heat of the exhaust gas combustion chamber 26 can be more suitably transmitted to the reformer 20, it is possible to effectively suppress occurrence of the situation where the wall of the exhaust gas combustion chamber 26 reaches the avoidance temperature. Further, it is possible to effectively utilize the heat of the exhaust gas combustion chamber 26 to heat the reformer 20.

In the fuel cell module 10 according to the embodiment as described above, the space 36 is formed between the outer bottom surface of the exhaust gas combustion chamber 26 and the inner bottom surface of the auxiliary device case 28. In this case, since transmission of the heat of the exhaust gas combustion chamber 26 to the auxiliary device case 28 can be suppressed by the heat insulating effect of the space 36, it is possible to suppress increase in the temperature of the auxiliary device case 28. As a result, it is possible to effectively suppress generation of the thermal stress in the auxiliary device case 28, the first connector section 37a, and the third connector section 37c, etc., and generation of deformation which may cause degradation in the durability.

In the fuel cell module 10 according to the embodiment as described above, the combustion exhaust gas can flow through the space 36 formed between the outer bottom surface of the exhaust gas combustion chamber 26 and the inner bottom surface of the auxiliary device case 28. In this case, also by the heat exchange between the first bottom wall 30c of the exhaust gas combustion chamber 26 and the combustion exhaust gas, it is possible to suppress increase in the temperature of the exhaust gas combustion chamber 26. Accordingly, it is possible to more effectively suppress occurrence of the situation where the exhaust gas combustion chamber 26 reaches the avoidance temperature.

The present invention is not limited to the above-described embodiment. Various modifications may be made without departing from the gist of the present invention.

What is claimed is:

1. A fuel cell module comprising:
   a fuel cell configured to perform power generation consuming a fuel gas and an oxygen containing gas supplied to the fuel cell, and discharge a fuel exhaust gas and an oxygen-containing exhaust gas;
   a reformer configured to reform a raw fuel chiefly containing hydrocarbon using water vapor, and produce the fuel gas supplied to the fuel cell;
   an evaporator configured to evaporate water to produce the water vapor supplied to the reformer;
   a combustor configured to combust the fuel exhaust gas and the oxygen-containing exhaust gas inside an exhaust gas combustion chamber to produce a combustion exhaust gas; and
   an auxiliary device case configured to accommodate the reformer, the evaporator, and at least part of the exhaust gas combustion chamber,
   wherein
   each of the reformer and the evaporator provided adjacent to each other extend in a direction to surround at least part of an outer periphery of the exhaust gas combustion chamber as viewed in a direction in which the reformer and the evaporator are arranged,
   the auxiliary device case surrounds an outer periphery of the reformer and an outer periphery of the evaporator with clearance,
   both ends of the evaporator in a direction in which the evaporator extends are spaced from each other,
   the evaporator and the auxiliary device case contact each other at a part of a bottom of the evaporator, at a positioning section that is provided on an upper wall of the evaporator, and at a first connector section at one position,
   each of the part of the bottom of the evaporator and the positioning section contacts the auxiliary device case so as to be movable relative to the auxiliary device case,
   the evaporator is connected to the auxiliary device case only by the first connector section at the one position so as to be unmovable relative to each other,
   the evaporator and the reformer are connected together only by a second connector section at one position,
   both ends of the reformer in a direction in which the reformer extends are spaced from each other, and
   the reformer and the auxiliary device case are connected together only by a third connector section at one position.

2. The fuel cell module according to claim 1, wherein at least part of walls forming the auxiliary device case and the exhaust gas combustion chamber is provided with uneven sections configured to absorb heat deformation.

3. The fuel cell module according to claim 1, wherein
   the exhaust gas combustion chamber includes a first chamber and a second chamber connected to each other, and a combustion chamber outlet configured to discharge the combustion exhaust gas in the exhaust gas combustion chamber,
   at least part of an outer wall surface of the first chamber faces the evaporator with clearance,
   the combustion exhaust gas discharged from the combustion chamber outlet is allowed to flow between the outer wall surface of the first chamber and the evaporator, and
   at least part of a wall forming the second chamber is a common wall shared with the reformer.

4. The fuel cell module according to claim 3, wherein the auxiliary device case comprises:
   an evaporator accommodation chamber configured to accommodate the first chamber and the evaporator;
   a reformer accommodation chamber configured to accommodate the second chamber and the reformer; and
   a compartment wall configured to separate the evaporator accommodation chamber from the reformer accommodation chamber, and wherein
   the second chamber is provided with the combustion chamber outlet, the combustion chamber outlet being configured to enable the combustion exhaust gas in the exhaust gas combustion chamber to flow between an outer wall surface of the reformer and an inner wall surface of the reformer accommodation chamber,
   the compartment wall is provided with an accommodation chamber connection port configured to enable the combustion exhaust gas, which has been subjected to heat exchange with the reformer in the reformer accommodation chamber, to flow through the evaporator accommodation chamber, and
   the evaporator accommodation chamber is provided with a combustion exhaust gas outlet configured to discharge the combustion exhaust gas, which has been subjected to heat exchange with the first chamber and the evaporator, from the evaporator accommodation chamber.

5. The fuel cell module according to claim 3, wherein
   the combustion chamber outlet is provided between the both ends of the reformer, and
   an entire peripheral wall forming the second chamber and an entire inner peripheral wall of the reformer form the common wall.

6. The fuel cell module according to claim 1, wherein a space is formed between an outer bottom surface of the exhaust gas combustion chamber and an inner bottom surface of the auxiliary device case.

7. The fuel cell module according to claim 6, wherein the combustion exhaust gas is allowed to flow through the space formed between the outer bottom surface of the exhaust gas combustion chamber and the inner bottom surface of the auxiliary device case.

\* \* \* \* \*